(12) United States Patent
Hinnant et al.

(10) Patent No.: US 8,417,795 B1
(45) Date of Patent: Apr. 9, 2013

(54) METHODS, SYSTEMS, AND COMPUTER PROGRAM PRODUCTS FOR PROVISIONING SERVICE BETWEEN A NETWORK ACCESS DEVICE AND A NETWORK INTERFACE UNIT

(75) Inventors: David Hinnant, Raleigh, NC (US); Billy McFall, Durham, NC (US); Larry Paulhus, Garner, NC (US); Matthew B. Squire, Raleigh, NC (US)

(73) Assignee: Horizon Technology Funding Company V LLC, Farmington, CT (US)

( * ) Notice: Subject to any disclaimer, the term of this patent is extended or adjusted under 35 U.S.C. 154(b) by 2585 days.

(21) Appl. No.: 10/611,608

(22) Filed: Jul. 1, 2003

Related U.S. Application Data

(60) Provisional application No. 60/392,755, filed on Jul. 1, 2002.

(51) Int. Cl.
*G06F 15/177* (2006.01)
*G06F 3/00* (2006.01)
(52) U.S. Cl. ............ 709/220; 709/221; 709/222; 710/8; 710/10; 710/104; 710/301; 710/302
(58) Field of Classification Search ................... 709/220, 709/221, 222; 710/8, 10, 301, 302, 104
See application file for complete search history.

(56) References Cited

U.S. PATENT DOCUMENTS

| | | | | |
|---|---|---|---|---|
| 5,588,051 | A * | 12/1996 | Berkowitz et al. | 379/243 |
| 5,835,580 | A * | 11/1998 | Fraser | 379/115.01 |
| 6,209,089 | B1 * | 3/2001 | Selitrennikoff et al. | 713/2 |
| 6,243,774 | B1 * | 6/2001 | Eide et al. | 710/302 |
| 6,487,200 | B1 * | 11/2002 | Fraser | 370/389 |
| 2003/0074246 | A1 * | 4/2003 | Adams et al. | 705/8 |
| 2006/0161649 | A1 * | 7/2006 | Chikada et al. | 709/224 |

* cited by examiner

*Primary Examiner* — Krisna Lim
(74) *Attorney, Agent, or Firm* — Myers Bigel Sibley & Sajovec, P.A.

(57) ABSTRACT

A service is configured by provisioning the service for a facility on a network access device (NAD). The service endpoint is created in an operationally disabled state responsive to provisioning the service. A first network interface unit (NIU) is detected connecting to the facility. The first NIU has an identification code associated therewith. The service transitions to an operationally enabled state responsive to detecting the first NIU connecting to the facility. The identification code is associated with the facility. The first NIU is detected disconnecting from the facility. The service transitions to an operationally disabled state responsive to detecting the first NIU disconnecting from the facility. A second NIU is detected connecting to the facility. The second NIU has an identification code associated therewith. The identification code of the second NIU is compared with the identification code of the first NIU. The service transitions to an operationally enabled state if the identification code of the second NIU matches the identification code of the first NIU indicating that the first and second NIUs are the same NIU.

14 Claims, 7 Drawing Sheets

METHODS, SYSTEMS, AND COMPUTER PROGRAM PRODUCTS FOR PROVISIONING SERVICE BETWEEN A NETWORK ACCESS DEVICE AND A NETWORK INTERFACE UNIT

RELATED APPLICATIONS

This application claims priority to and the benefit of Provisional Application No. 60/392,755, filed Jul. 1, 2002.

BACKGROUND OF THE INVENTION

The present invention relates to the field of telecommunications, and, more particularly, to methods, systems, and computer program products for provisioning telecommunication services.

When telecommunication services, e.g., T1 voice circuits, T1 data circuits, frame relay services, etc., are provisioned between customer premise equipment (CPE) demaracation points, which typically reside in a wiring closet in or near a subscriber's physical location, and a network access device (NAD) termination point, which typically resides in a remote terminal (RT) and/or in a central office (CO), there is typically an explicit, predetermined, one-to-one association between a given physical facility at the RT/CO and the subscriber's CPE interface. This association is typically inflexible. This inflexibility is problematic in that any re-cabling that is performed as a result of equipment failure and/or subscriber CPE relocation may introduce errors where service is unexpectedly interrupted. Correcting these errors is costly and/or time consuming. The inflexible association may also complicate initial service activation. For example, even though a bank of connections may be present in the CPE (e.g., to service a floor of a building) and are connected back to the CO/RT, the specific cable for a given subscriber's CPE must be known so that the correct association is assured.

Moreover, operation costs, such as installation, maintenance, troubleshooting, and/or repair, often account for most of the cost of a network over its lifetime. Typically, whenever there is a change in service to a customer/subscriber, such as activating a new service, relocating an existing service, and/or reactivating an existing service after an outage, a technician may take extra care to ensure that a complex chain of connectivity is established. In particular, the technician may ensure that elements at the central office (CO), intervening cable segments, repeaters, etc., and a demarcation device at the customer premises are precisely matched to provide service. It is desirable, therefore, to streamline service provisioning operations to lower operational costs and improve business efficiency.

SUMMARY OF THE INVENTION

According to some embodiments of the present invention, a service is configured by provisioning the service for a facility on a network access device (NAD). The service endpoint is created in an operationally disabled state responsive to provisioning the service. A first network interface unit (NIU) is detected connecting to the facility. The first NIU has an identification code associated therewith. The service transitions to an operationally enabled state responsive to detecting the first NIU connecting to the facility. The NIU identification code becomes associated with the NAD facility. The first NIU is detected disconnecting from the facility. The service transitions to an operationally disabled state responsive to detecting the first NIU disconnecting from the facility. A second NIU is detected connecting to the facility. The second NIU has an identification code associated therewith. The identification code of the second NIU is compared with the identification code of the NIU associated with the NAD facility to which the second NIU is connected. The service transitions to an operationally enabled state if the identification code of the second NIU matches the identification code of the NIU associated with the NAD facility to which the second NIU is connected indicating that the first and second NIUs are the same NIU. The service remains operationally disabled if the second NIU is not the same as the first NIU.

In further embodiments of the present invention, a service is configured by provisioning the service for a facility on a NAD. The service endpoint is created in an operationally disabled state responsive to provisioning the service. A first NIU is detected connecting to the facility. The service transitions to an operationally enabled state responsive to detecting the first NIU connecting to the facility. The first NIU is detected disconnecting from the facility. The service transitions to an operationally disabled state responsive to detecting the first NIU disconnecting from the facility. A second NIU is detected connecting to the facility. The service transitions to an operationally enabled state responsive to detecting the second NIU connecting to the facility.

In still further embodiments of the present invention, a service is configured by provisioning the service for a facility on a NAD. The service endpoint is created in an operationally disabled state responsive to provisioning the service. An expected NIU identification code is associated with the facility responsive to provisioning the service. A NIU is detected connecting to the facility. The NIU has an identification code associated therewith. The identification code of the NIU is compared with the expected NIU identification code. The service transitions to an operationally enabled state if the identification code of the NIU matches the expected NIU identification code. The service remains operationally disabled if the NIU connected to the facility is not the expected NIU.

In still further embodiments of the present invention, a service is configured by provisioning a service for a NAD. The service endpoint is created in an operationally disabled state responsive to provisioning the service. An expected NIU identification code is associated with the NAD responsive to provisioning the service. A first NIU is detected connecting to a facility on the NAD. The first NIU has an identification code associated therewith. The identification code of the first NIU is compared with the expected NIU identification code. The service transitions to an operationally enabled state on the facility if the identification code of the first NIU matches the expected NIU identification code. The first NIU is detected disconnecting from the facility. The service transitions to an operationally disabled state responsive to detecting the first NIU disconnecting from the facility. The first NIU is detected connecting to another facility on the NAD. A determination is made if the second facility matches the first facility. The service transitions to an operationally enabled state if the first NIU has reconnected to the first facility. The service remains operationally disabled on the second facility if the first NIU has connected to a different facility.

In still further embodiments of the present invention, a service is configured by provisioning a service for a NAD. The service endpoint is created in an operationally disabled state responsive to provisioning the service. An expected NIU identification code is associated with the NAD responsive to provisioning the service. A first NIU is detected connecting to a first facility on the NAD. The first NIU has an identification code associated therewith. The identification code of the first NIU is compared with the expected NIU identification code. The service transitions to an operationally enabled state on the facility if the identification code of the first NIU matches the expected NIU identification code. The first NIU is detected disconnecting from the first facility. The service transitions to an operationally disabled state responsive to detecting the first NIU disconnecting from the facility. The first NIU is detected connecting to another facility on the NAD. The service transitions to an operationally enabled state on the second facility.

In accordance with particular embodiments of the present invention, an authorization for activation of the service may be obtained before the service is operationally enabled. The service may be manually configured in an operationally enabled state by one or more service technicians. In addition, when a NIU connects to a facility on the NAD, the NIU may be remotely provisioned based on a NAD service configuration. One or more service technicians may manually intervene to detect a NIU connecting and/or disconnecting from a facility on the NAD in accordance with some embodiments of the present invention. One or more service technicians may also be involved in manually associating the identification code of a NIU with a facility.

Although described above primarily with respect to method embodiments of the present invention, it will be understood that the present invention may be embodied as methods, systems, and/or computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
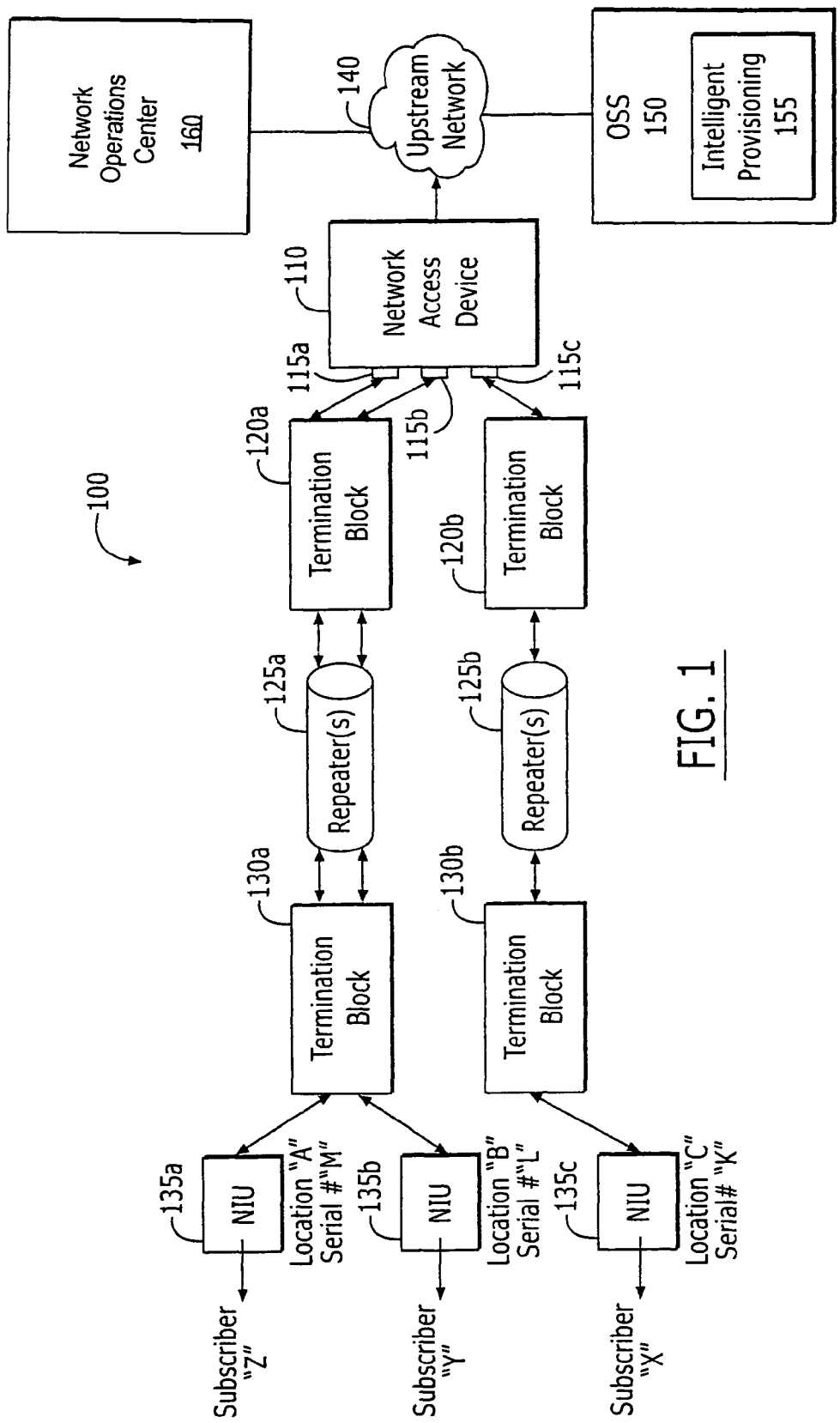
FIG. 1 is a block diagram that illustrates a network architecture over which services may be provisioned in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures. It will also be understood that when an element is referred to as being "connected" or "coupled" to another element, it can be directly connected or coupled to the other element or intervening elements may also be present. In contrast, when an element is referred to as being "directly connected" or "directly coupled" to another element, there are no intervening elements present.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM).

Embodiments of the present invention are described herein in the context of provisioning a service. As used herein, provisioning means providing telecommunications service to a user, including everything necessary to set up the service, such as equipment, wiring, and transmission. Provisioning also encompasses the term configuring as telecommunications lines and/or equipment may be configured and enabled for various options associated with a service a customer has chosen.

FIG. 1 is a block diagram that illustrates a network architecture over which services may be provisioned in accordance with some embodiments of the present invention. Referring now to FIG. 1, a network architecture 100 comprises a network access device (NAD) 110 that is connected to three subscribers X, Y, and Z via facilities 115a, 115b, and 115c, termination blocks 120a and 120b, repeaters 125a and 125b, termination blocks 130a and 130b, and network interface units (NIUs) 135a, 135b, and 135c, which are configured as shown. Wires, cables, and/or wireless media may be used to connect the NIUs 135a, 135b, and 135c to the NAD 110 via the termination blocks 120a, 120b, 130a, 130b, and repeaters 125a, 125b of FIG. 1. The NIUs 135a, 135b, 135c are the physical hardware that may be configured to provide a customer premises equipment (CPE) demarcation point. The NAD 110 provides an interface for the NIUs 135a, 135b, 135c to the upstream network 140. Network services may be provided through the NAD 110 and provisioned on the various facilities 115a, 115b, 115c for subscribers X, Y, and Z. The NAD 110 may communicate with an operations support system (OSS) 150, which may supervise and/or manage the provisioning of services on the network 100 via the NAD 110 using, for example, an intelligent provisioning module 155 that executes thereon. The NAD 110 may also communicate with a Network Operations Center (NOC) 160, which may be used to process alarms, for example.

There are various associations between a facility 115a, 115b, 115c and a NIU 135a, 135b, 135c that can be made to allow for flexible provisioning and re-provisioning of services provided via the media between the NAD 110 and the NIUs 135a, 135b, 135c. These associations may depend on information that may or may not be known by a technician and/or stored by the NIUs 135a, 135b, 135c and/or the NAD 110. For example, a NIU may include pre-defined factory information, such as a serial number, model number, etc., but this information may or may not be known to a technician involved in provisioning or re-provisioning a service. Similarly, a technician may or may not know the exact facility on a NAD that a given cable is connected to. The technician may only know that a cable terminates on a given card or rack in a NAD.

According to some embodiments of the present invention, associations between a NIU and a facility on a NAD may be defined and rules associated therewith to allow the intelligent provisioning module 155 to, for example, enable a service, re-enable a service after an outage, migrate a service, and/or disable a service when the NIU/NAD connection changes state, e.g., changes between a connected and an unconnected state.

Service provisioning typically involves multiple steps and may require the assistance of one or more technicians to provision the NAD, connect various cables and other media, and/or provision the NIU. In general, these operations can occur in any order. In accordance with some embodiments of the present invention, NAD services may be "pre-provisioned." That is, the service configuration can be set up and the NAD can wait for a NIU to appear on a facility.

Although FIG. 1 illustrates an exemplary network architecture over which services may be provisioned, it will be understood that the present invention is not limited to such configurations, but is intended to encompass any configuration capable of carrying out the operations described herein. It will be appreciated that, in accordance with some embodiments of the present invention, the functionality of the intelligent provisioning module 155 may be implemented using discrete hardware components, one or more application specific integrated circuits (ASICs), a programmed digital signal processor or microcontroller, a program stored in a memory and executed by a processor, and/or combinations thereof. In this regard, computer program code for carrying out operations of the intelligent provisioning module 155 may be written in a high-level programming language, such as C or C++, for development convenience. In addition, computer program code for carrying out operations of the present invention may also be written in other programming languages, such as, but not limited to, interpreted languages. Some modules or routines may be written in assembly language or even microcode to enhance performance and/or memory usage.

The present invention is described hereinafter with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 2:
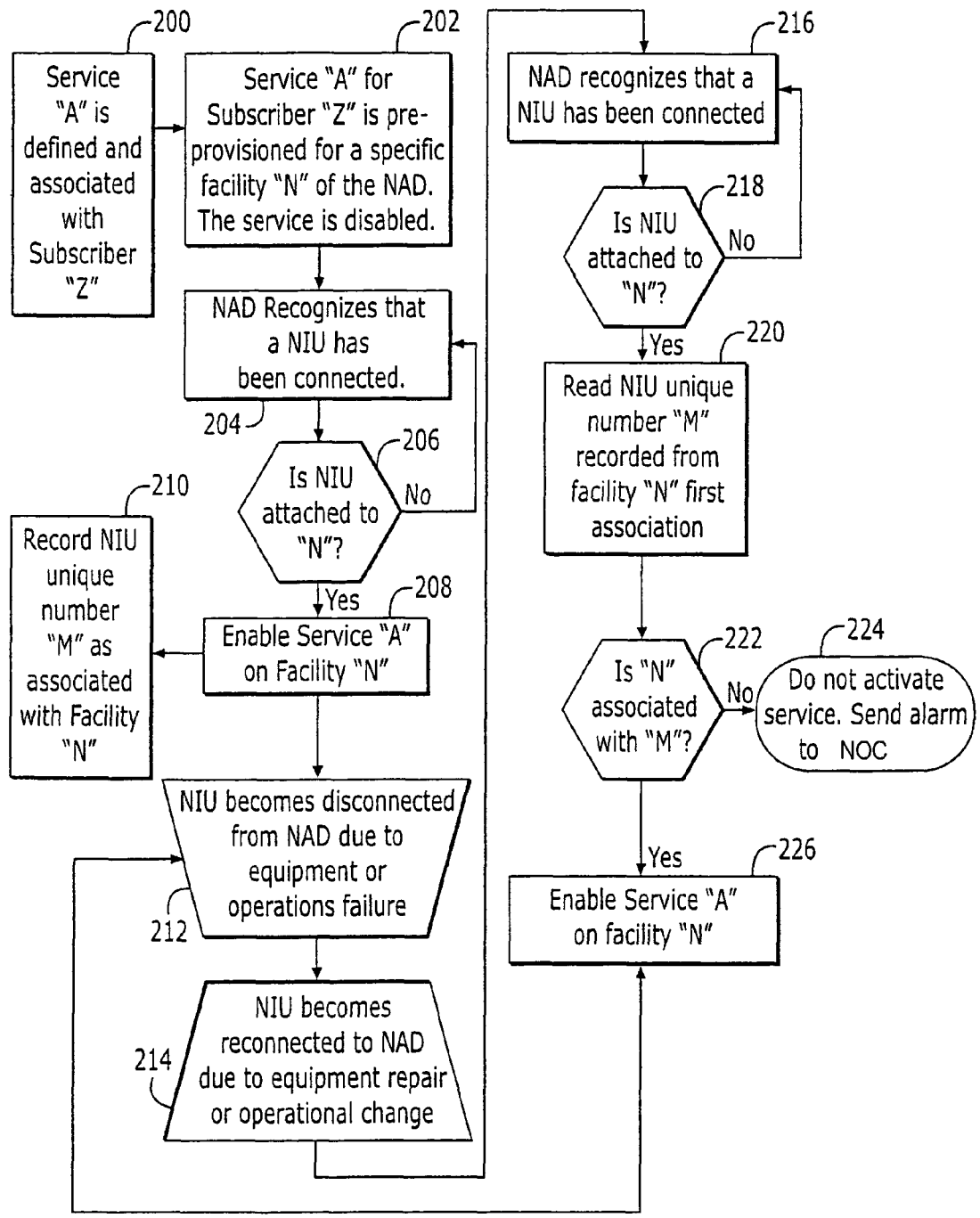
FIGS. 2-7 are flowcharts that illustrate operations for provisioning a service between a network access device (NAD) and a network interface unit (NIU), in accordance with some embodiments of the present invention.

Referring now to FIG. 2, operations for provisioning a service between a NAD and a NIU, in accordance with some embodiments of the present invention, will now be described. Operations begin at block 200 where a service A is defined and associated with a subscriber Z shown, for example, in FIG. 1. At block 202, service A is provisioned on a specific facility N on a NAD, such as facility 115*a* on NAD 110 of FIG. 1. The service A endpoint may be created in an operationally disabled state. At block 204, the NAD detects a first NIU, such as NIU 135*a* of FIG. 1, establishing a connection with the NAD. A determination is made at block 206 whether the first NIU has connected to the facility N. If the first NIU has connected to the facility N, then operations continue at block 208 where the service A transitions to an operationally enabled state. In accordance with some embodiments of the present invention, the first NIU has an identification code or unique number, such as a serial number, associated therewith. This identification code m is recorded at block 210 and is associated with the facility N.

At block 212, the NAD detects the first NIU disconnecting from the facility N due to, for example, an equipment or operations failure or change. The service A may transition to an operationally disabled state when the first NIU has been detected as having disconnected from the facility N in accordance with some embodiments of the present invention. At block 214, a second NIU establishes a connection with the NAD. The NAD detects the second NIU at block 216 and a determination is made whether the second NIU connected to the same facility N as the first NIU at block 218. If the second NIU has connected to a facility other than facility N, then the connection is ignored; otherwise, operations continue at block 220 where the identification code m of the first NIU is obtained. At block 222, a comparison to determine if the identification code associated with the second NIU matches the identification code m associated with the first NIU and associated with the facility N. If the second NIU is different from the first NIU, then an alarm is activated at block 224. Otherwise, the service A transitions to an operationally enabled state on the facility N at block 226. Thus, embodiments of the present invention described and illustrated with respect to FIG. 2 may ensure that CPE equipment for one subscriber cannot be mistakenly connected to another subscriber.

In accordance with particular embodiments of the present invention, an authorization for activation of the service may be obtained before the service A is operationally enabled. The service A may be manually configured in an operationally enabled state by one or more service technicians. In addition, when a NIU connects to a facility on the NAD, the NIU may be remotely provisioned based on a NAD service configuration. One or more service technicians may manually intervene to detect a NIU connecting and/or disconnecting from a facility on the NAD in accordance with some embodiments of the present invention. One or more service technicians may also be involved in manually associating the identification code of a NIU with a facility.

Figure 3:
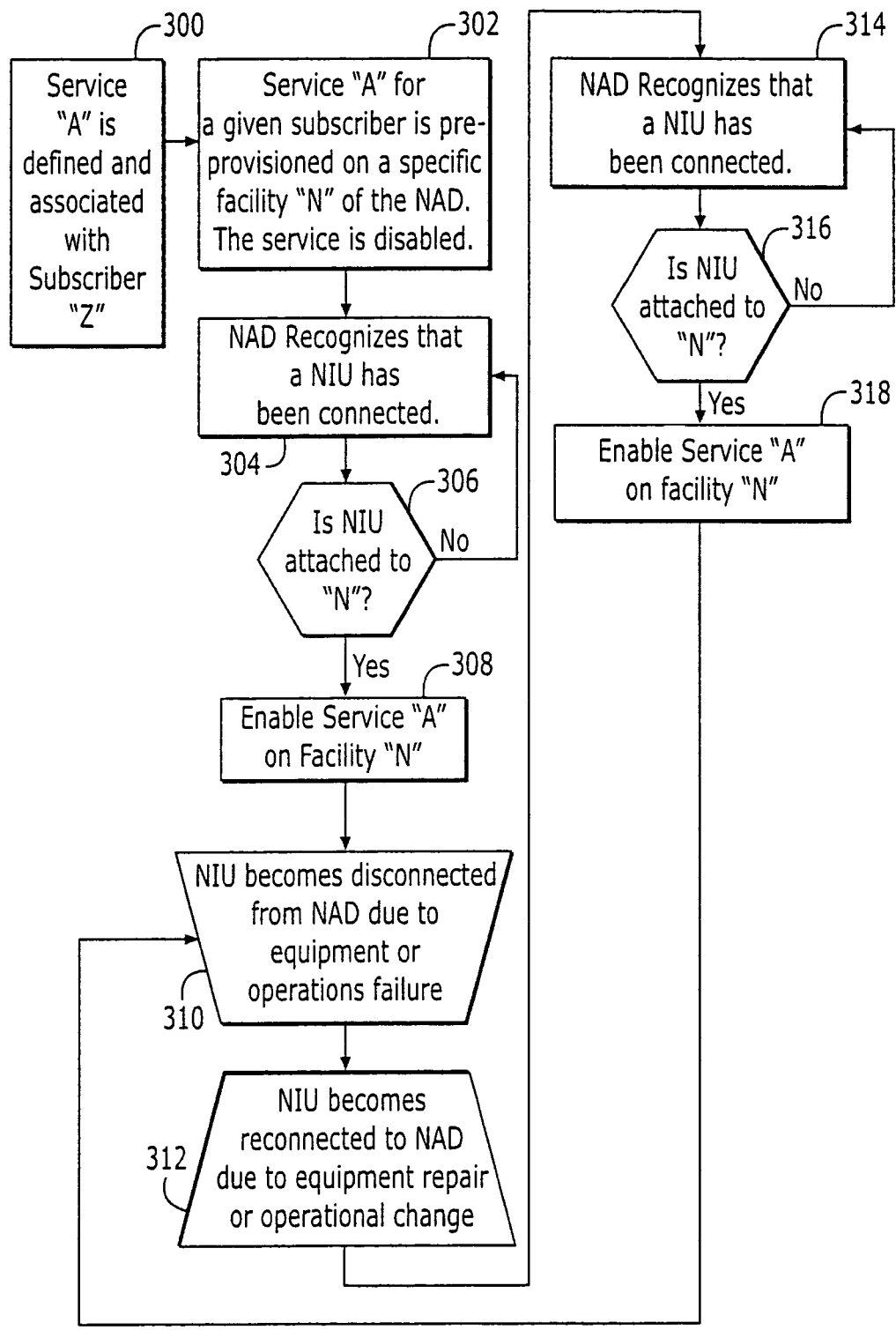

Referring now to FIG. 3, operations for provisioning a service between a NAD and a NIU, in accordance with additional embodiments of the present invention, will now be described. Operations begin at block 300 where a service A is defined and associated with a subscriber Z shown, for example, in FIG. 1. At block 302, service A is provisioned on a specific facility N on a NAD, such as facility 115*a* on NAD 110 of FIG. 1. The service A endpoint may be created in an operationally disabled state. At block 304, the NAD detects a first NIU, such as NIU 135a of FIG. 1, establishing a connection with the NAD. A determination is made at block 306 whether the first NIU has connected to the facility N. If the first NIU has connected to the facility N, then operations continue at block 308 where the service A transitions to an operationally enabled state.

At block 310, the NAD detects the first NIU disconnecting from the facility N due to, for example, an equipment or operations failure or change. The service A may transition to an operationally disabled state when the first NIU has been detected as having disconnected from the facility N in accordance with some embodiments of the present invention. At block 312, a second NIU establishes a connection with the NAD. The NAD detects the second NIU at block 314 and a determination is made whether the second NIU connected to the same facility N as the first NIU at block 316. If the second NIU has connected to a facility other than facility N, then the connection is ignored; otherwise, operations continue at block 318 where the service A transitions to an operationally enabled state on the facility N. Thus, after a NIU has become disconnected from a facility, embodiments of the present invention described and illustrated with respect to FIG. 3 may allow the same NIU or a different NIU to reconnect to the facility. In accordance with some embodiments of the present invention, an alarm may be activated if a different NIU reconnects to the facility to indicate that an equipment change has occurred. Advantageously, embodiments of the present invention illustrated in FIG. 3 may provide for equipment replacement due to failure, upgrade, and/or subscriber relocation.

In accordance with particular embodiments of the present invention, an authorization for activation of the service may be obtained before the service A is operationally enabled. The service A may be manually configured in an operationally enabled state by one or more service technicians. In addition, when a NIU connects to a facility on the NAD, the NIU may be remotely provisioned based on a NAD service configuration. One or more service technicians may manually intervene to detect a NIU connecting and/or disconnecting from a facility on the NAD in accordance with some embodiments of the present invention.

Figure 4:
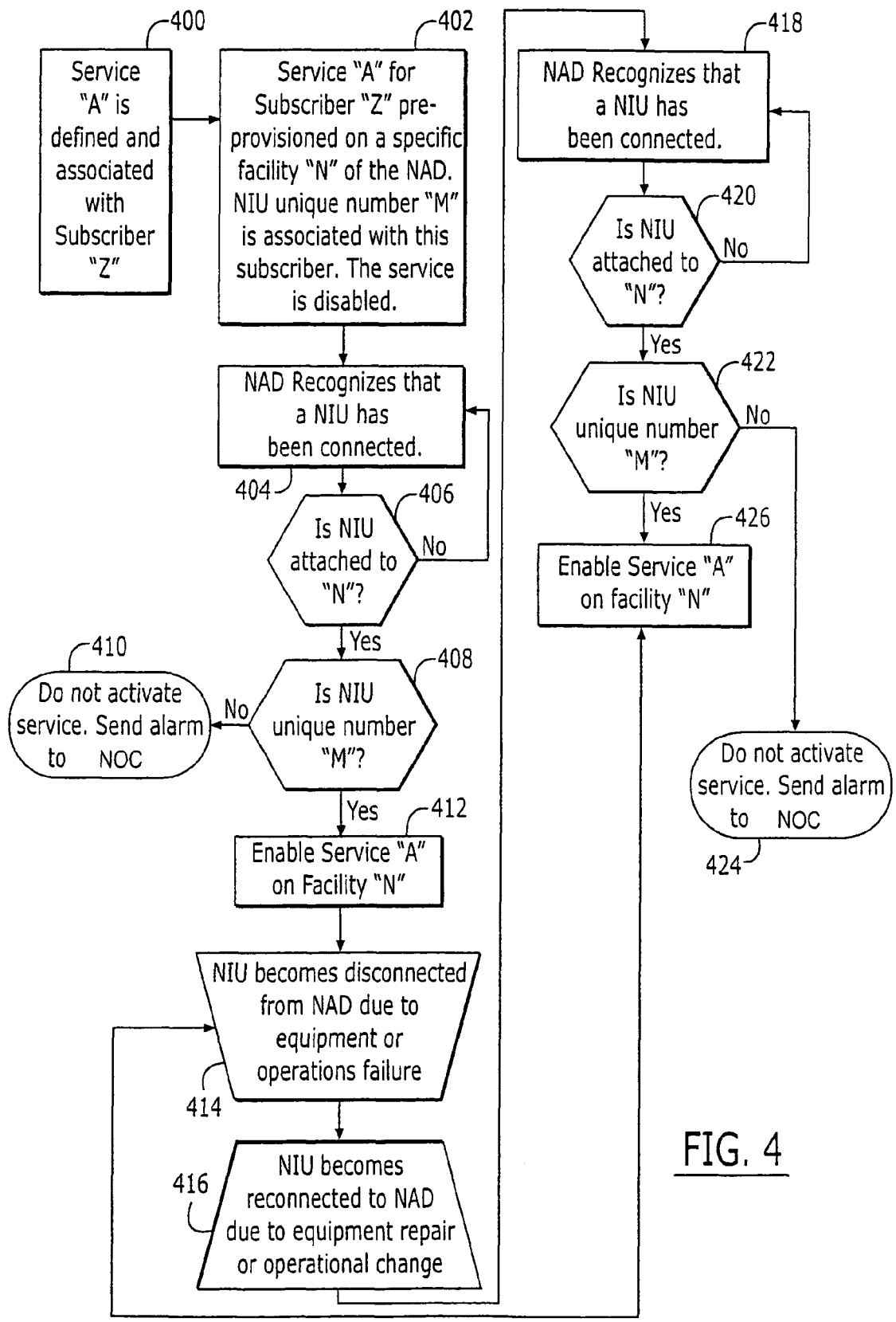

Referring now to FIG. 4, operations for provisioning a service between a NAD and a NIU, in accordance with additional embodiments of the present invention, will now be described. Operations begin at block 400 where a service A is defined and associated with a subscriber Z shown, for example, in FIG. 1. At block 402, service A is provisioned on a specific facility N on a NAD, such as facility 115a on NAD 110 of FIG. 1. The service A endpoint may be created in an operationally disabled state. In addition, an expected NIU identification code m, such as a unique number and/or serial number, is associated with the facility N. At block 404, the NAD detects a first NIU, such as NIU 135a of FIG. 1, establishing a connection with the NAD. A determination is made at block 406 whether the first NIU has connected to the facility N. If the first NIU has connected to the facility N, then operations continue at block 408 where the identification code of the first NIU is compared with the identification code m of the expected NIU. If the identification code of the first NIU does not match the identification code m of the expected NIU, then an alarm is activated at block 410. Otherwise, the service A transitions to an operationally enabled state at block 412.

At block 414, the NAD detects the first NIU disconnecting from the facility N due to, for example, an equipment or operations failure or change. The service A may transition to an operationally disabled state when the first NIU has been detected as having disconnected from the facility N in accordance with some embodiments of the present invention. At block 416, a second NIU establishes a connection with the NAD. The NAD detects the second NIU at block 418 and a determination is made whether the second NIU connected to the same facility N as the first NIU at block 420. If the second NIU has connected to a facility other than facility N, then the connection is ignored; otherwise, operations continue at block 422 where the identification code of the second NIU is compared with the identification code m of the expected NIU. If the identification code of the second NIU does not match the identification code m of the expected NIU, then an alarm is activated at block 424. Otherwise, the service A transitions to an operationally enabled state on the facility N at block 426. Thus, embodiments of the present invention described and illustrated with respect to FIG. 4 may ensure that a one-to-one association exists between a NAD facility and a NIU to enhance security.

In accordance with particular embodiments of the present invention, an authorization for activation of the service may be obtained before the service A is operationally enabled. The service A may be manually configured in an operationally enabled state by one or more service technicians. In addition, when a NIU connects to a facility on the NAD, the NIU may be remotely provisioned based on a NAD service configuration. One or more service technicians may manually intervene to detect a NIU connecting and/or disconnecting from a facility on the NAD in accordance with some embodiments of the present invention. One or more service technicians may also be involved in manually associating the identification code of an expected NIU with a facility.

Figure 5:
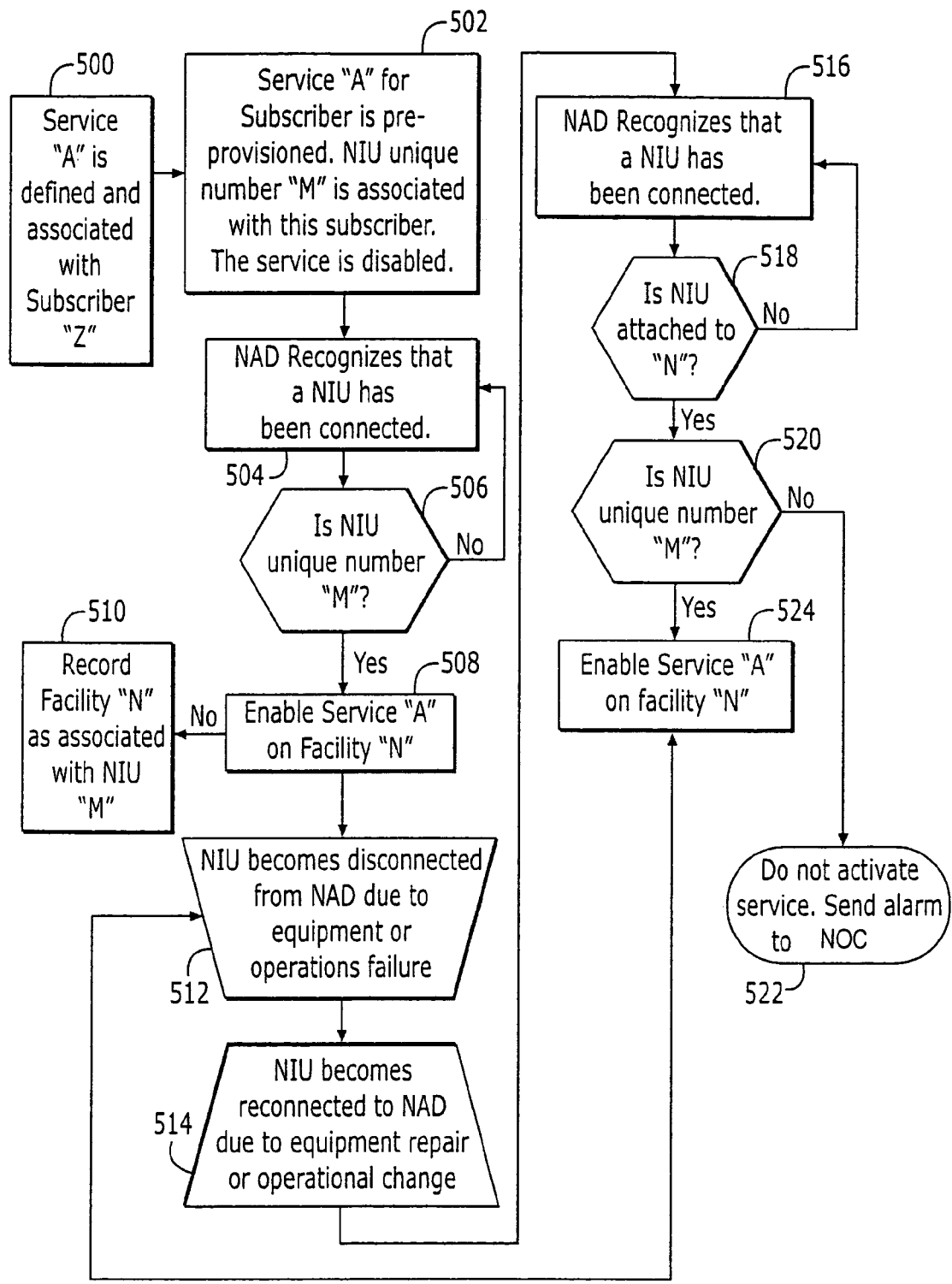

Referring now to FIG. 5, operations for provisioning a service between a NAD and a NIU, in accordance with additional embodiments of the present invention, will now be described. Operations begin at block 500 where a service A is defined and associated with a subscriber Z shown, for example, in FIG. 1. At block 502, service A is provisioned on a NAD, such as NAD 110 of FIG. 1. The service A endpoint may be created in an operationally disabled state. In addition, an expected NIU identification code m, such as a unique number and/or serial number, is associated with the NAD. At block 504, the NAD detects a first NIU, such as NIU 135a of FIG. 1, establishing a connection with the NAD. At block 506 the identification code of the first NIU is compared with the identification code m of the expected NIU. If the identification code of the first NIU does not match the identification code m of the expected NIU, then operations return to block 504 where the NAD waits for a NIU to be connected. Otherwise, the service A transitions to an operationally enabled state at block 508. In accordance with some embodiments of the present invention, the facility N over which the first NIU connected to the NAD is associated with the first NIU having an identification code m at block 510.

At block 512, the NAD detects the first NIU disconnecting from the facility N due to, for example, an equipment or operations failure or change. The service A may transition to an operationally disabled state when the first NIU has been detected as having disconnected from the facility N in accordance with some embodiments of the present invention. At block 514, a second NIU establishes a connection with the NAD. The NAD detects the second NIU at block 516 and a determination is made whether the second NIU connected to the same facility N as the first NIU at block 518. If the second NIU has connected to a facility other than facility N, then the connection is ignored; otherwise, operations continue at block 520 where the identification code of the second NIU is compared with the identification code m of the expected NIU. If the identification code of the second NIU does not match the identification code m of the expected NIU, then an alarm is activated at block 522. Otherwise, the service A transitions to an operationally enabled state on the facility N at block 524. Thus, embodiments of the present invention described and illustrated with respect to FIG. 5 may allow a technician to make any connection to a NAD and have the service become active without having to know the specific facility used, but protects the subscriber in the event of a future cabling error.

In accordance with particular embodiments of the present invention, an authorization for activation of the service may be obtained before the service A is operationally enabled. The service A may be manually configured in an operationally enabled state by one or more service technicians. In addition, when a NIU connects to a facility on the NAD, the NIU may be remotely provisioned based on a NAD service configuration. One or more service technicians may manually intervene to detect a NIU connecting and/or disconnecting from a facility on the NAD in accordance with some embodiments of the present invention. One or more service technicians may also be involved in manually associating the identification code of a NIU with a facility.

Figure 6:
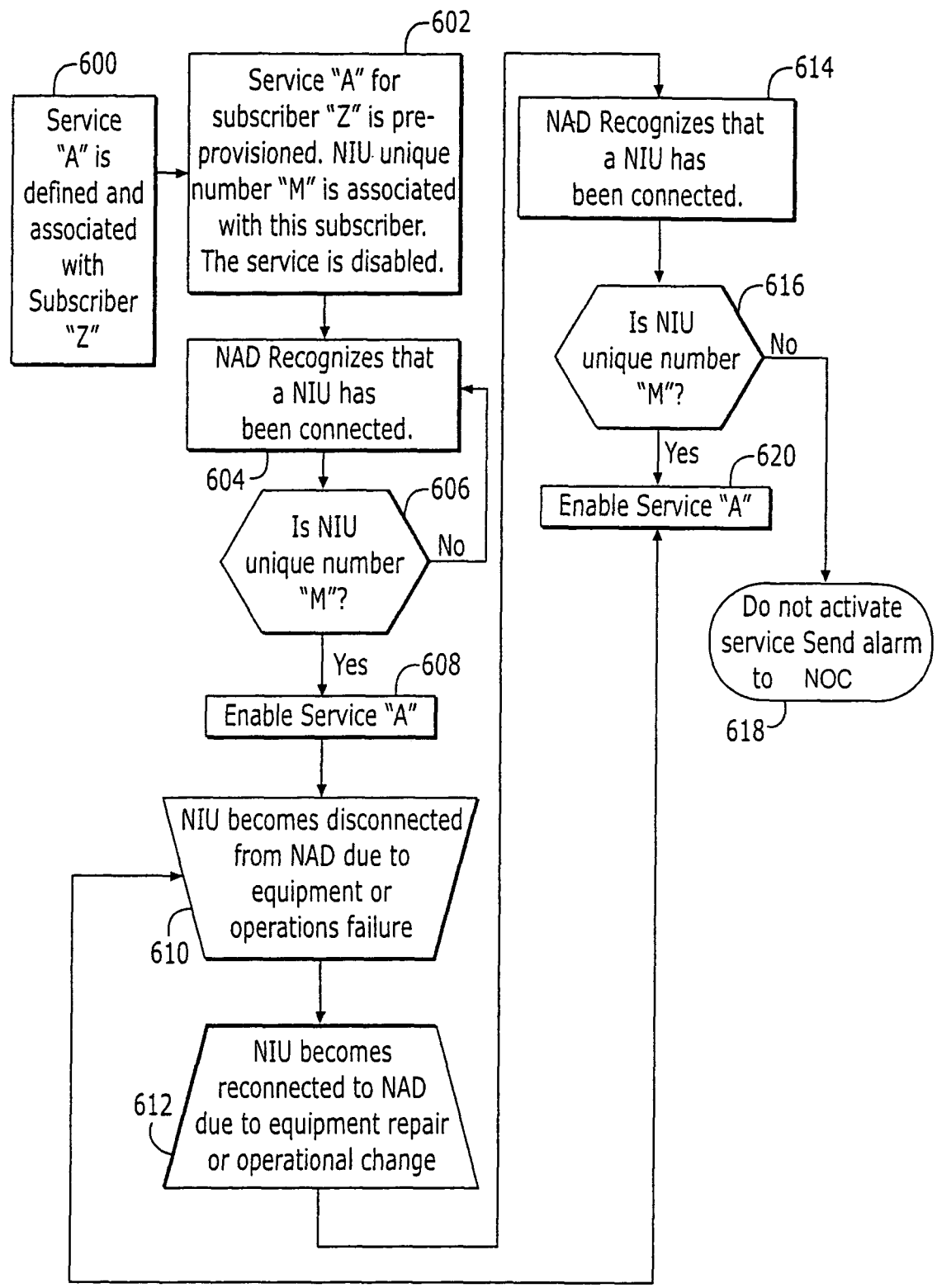

Referring now to FIG. 6, operations for provisioning a service between a NAD and a NIU, in accordance with additional embodiments of the present invention, will now be described. Operations begin at block 600 where a service A is defined and associated with a subscriber Z shown, for example, in FIG. 1. At block 602, service A is provisioned on a NAD, such as NAD 110 of FIG. 1. The service A endpoint may be created in an operationally disabled state. In addition, an expected NIU identification code m, such as a unique number and/or serial number, is associated with the NAD. At block 604, the NAD detects a first NIU, such as NIU 135a of FIG. 1, establishing a connection with the NAD. At block 606 the identification code of the first NIU is compared with the identification code m of the expected NIU. If the identification code of the first NIU does not match the identification code m of the expected NIU, then operations return to block 604 where the NAD waits for a NIU to be connected. Otherwise, the service A transitions to an operationally enabled state at block 608.

At block 610, the NAD detects the first NIU disconnecting from the NAD due to, for example, an equipment or operations failure or change. The service A may transition to an operationally disabled state when the first NIU has been detected as having disconnected from the NAD in accordance with some embodiments of the present invention. At block 612, a second NIU establishes a connection with the NAD. The NAD detects the second NIU at block 614 and, at block 616, the identification code of the second NIU is compared with the identification code m of the expected NIU. If the identification code of the second NIU does not match the identification code m of the expected NIU, then an alarm is activated at block 618. Otherwise, the service A transitions to an operationally enabled state on the NAD at block 620. Thus, embodiments of the present invention described and illustrated with respect to FIG. 6 may allow a subscriber's NIU to be physically moved and reconnected to any facility on the same NAD without re-provisioning.

In accordance with particular embodiments of the present invention, an authorization for activation of the service may be obtained before the service A is operationally enabled. The service A may be manually configured in an operationally enabled state by one or more service technicians. In addition, when a NIU connects to a facility on the NAD, the NIU may be remotely provisioned based on a NAD service configuration. One or more service technicians may manually intervene to detect a NIU connecting and/or disconnecting from a facility on the NAD in accordance with some embodiments of the present invention.

Figure 7:
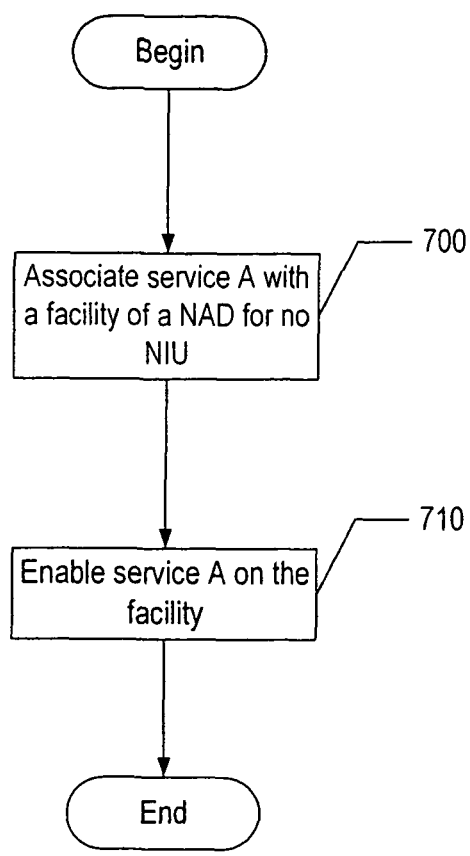

Referring now to FIG. 7, operations for provisioning a service between a NAD and a NIU, in accordance with additional embodiments of the present invention, will now be described. Operations begin at block 700 where a service A is associated with a facility of a NAD for no NIU. The service is then enabled on the facility at block 710.

In accordance with particular embodiments of the present invention, an authorization for activation of the service may be obtained before the service A is operationally enabled. The service A may be manually configured in an operationally enabled state by one or more service technicians.

The flowcharts of FIGS. 2-7 illustrate the architecture, functionality, and operations of some embodiments of systems, methods, and computer program products for provisioning service between a NAD and a NIU. In this regard, each block represents a module, segment, or portion of code, which comprises one or more executable instructions for implementing the specified logical function(s). It should also be noted that in other implementations, the function(s) noted in the blocks may occur out of the order noted in FIGS. 2 through 6. For example, two blocks shown in succession may, in fact, be executed substantially concurrently or the blocks may sometimes be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

What is claimed is:

1. A method of provisioning a service, comprising:
provisioning a service for a network access device (NAD);
creating the service in an operationally disabled state responsive to provisioning the service;
associating an expected network interface unit (NIU) identification code with the NAD responsive to provisioning the service;
detecting a first NIU connecting to a first facility on the NAD, the first NIU having a first identification code associated therewith;
comparing the first identification code of the first NIU with the expected NIU identification code;
transitioning the service to an operationally enabled state on the first facility only if the first identification code of the first NIU matches the expected NIU identification code;
detecting the first NIU disconnecting from the first facility;
transitioning the service to an operationally disabled state responsive to detecting the first NIU disconnecting from the first facility;
detecting a second NIU connecting to a second facility on the NAD, the second NIU having a second identification code associated therewith;
comparing the second identification code of the second NIU with the expected NIU identification code; and
transitioning the service to an operationally enabled state on the second facility if the second identification code of the second NIU matches the expected NIU identification code indicating that the first and second NIUs are the same NIU.

2. The method of claim 1, further comprising:
  activating an alarm if the second identification code of the second NIU does not match the expected NIU identification code indicating that the first and second NIUs are not the same NIU.

3. The method of claim 1, wherein transitioning the service to an operationally enabled state on the first facility if the first identification code of the first NIU matches the expected identification code comprises:
  obtaining an authorization for activation of the service if the first identification code of the first NIU matches the expected identification code; and
  transitioning the service to an operationally enabled state on the first facility responsive to obtaining the authorization.

4. The method of claim 1, wherein transitioning the service to an operationally enabled state on the first facility if the first identification code of the first NIU matches the expected identification code comprises:
  manually configuring the service in an operationally enabled state on the first facility if the first identification code of the first NIU matches the expected identification code via a service technician.

5. The method of claim 1, wherein transitioning the service to an operationally enabled state on the first facility if the first identification code of the first NIU matches the expected identification code comprises:
  remotely provisioning the first NIU based on a NAD service configuration.

6. The method of claim 1, wherein transitioning the service to an operationally enabled state on the second facility if the second identification code of the second NIU matches the expected NIU identification code indicating that the first and second NIUs are the same NIU comprises:
  obtaining an authorization for activation of the service if the second identification code of the second NIU matches the expected NIU identification code indicating that the first and second NIUs are the same NIU; and
  transitioning the service to an operationally enabled state on the second facility responsive to obtaining the authorization.

7. The method of claim 1, wherein transitioning the service to an operationally enabled state on the second facility if the second identification code of the second NIU matches the expected NIU identification code indicating that the first and second NIUs are the same NIU comprises:
  manually configuring the service in an operationally enabled state on the second facility if the second identification code of the second NIU matches the expected NIU identification code indicating that the first and second NIUs are the same NIU via a service technician.

8. The method of claim 1, wherein transitioning the service to an operationally enabled state on the second facility if the second identification code of the second NIU matches the expected NIU identification code indicating that the first and second NIUs are the same NIU comprises:
  remotely provisioning the second NIU based on a NAD service configuration.

9. The method of claim 1, wherein detecting the first NIU connecting to the facility comprises:
  detecting the first NIU connecting to the first facility via manual intervention by a service technician.

10. The method of claim 1, wherein detecting the first NIU disconnecting from the first facility comprises:
  detecting the first NIU disconnecting from the first facility via manual intervention by a service technician.

11. The method of claim 1, wherein detecting the second NIU connecting to the second facility comprises:
  detecting the second NIU connecting to the second facility via manual intervention by a service technician.

12. The method of claim 1, wherein associating the expected NIU identification code with the NAD comprises:
  associating the expected NIU identification code with the NAD via manual intervention by a service technician.

13. A system for provisioning a service, comprising:
  means for provisioning a service for a network access device (NAD);
  means for creating the service in an operationally disabled state responsive to the means for provisioning the service;
  means for associating an expected network interface unit (NIU) identification code with the NAD responsive to provisioning the service;
  means for detecting a first NIU connecting to a first facility on the NAD, the first NIU having a first identification code associated therewith;
  means for comparing the first identification code of the first NIU with the expected NIU identification code;
  means for transitioning the service to an operationally enabled state on the first facility only if the first identification code of the first NIU matches the expected NIU identification code;
  means for detecting the first NIU disconnecting from the first facility;
  means for transitioning the service to an operationally disabled state responsive to detecting the first NIU disconnecting from the first facility;
  means for detecting a second NIU connecting to a second facility on the NAD, the second NIU having a second identification code associated therewith;
  means for comparing the second identification code of the second NIU with the expected NIU identification code; and
  means for transitioning the service to an operationally enabled state on the second facility if the second identification code of the second NIU matches the expected NIU identification code indicating that the first and second NIUs are the same NIU.

14. A computer program product for provisioning a service, comprising:
  a computer readable memory having computer readable program code embodied therein, the computer readable program code comprising:
  computer readable program code configured to provision a service for a network access device (NAD);
  computer readable program code configured to create the service in an operationally disabled state responsive to the computer readable program code configured to provision the service;
  computer readable program code configured to associate an expected network interface unit (NIU) identification code with the NAD responsive to provisioning the service;
  computer readable program code configured to detect a first NIU connecting to a first facility on the NAD, the first NIU having a first identification code associated therewith;
  computer readable program code configured to compare the first identification code of the first NIU with the expected NIU identification code;
  computer readable program code configured to transition the service to an operationally enabled state on the first facility only if the first identification code of the first NIU matches the expected NIU identification code;

computer readable program code configured to detect the first NIU disconnecting from the first facility;

computer readable program code configured to transition the service to an operationally disabled state responsive to detecting the first NIU disconnecting from the first facility;

computer readable program code configured to detect a second NIU connecting to a second facility on the NAD, the second NIU having a second identification code associated therewith;

computer readable program code configured to compare the second identification code of the second NIU with the expected NIU identification code; and computer readable program code configured to transition the service to an operationally enabled state on the second facility if the second identification code of the second NIU matches the expected NIU identification code indicating that the first and second NIUs are the same NIU.

* * * * *